Aug. 20, 1957 — W. P. HICKEY — 2,803,400
EFFICIENCY METERING SYSTEM
Filed Dec. 22, 1953 — 2 Sheets-Sheet 1

Inventor:
William P. Hickey,
by
His Agent.

Aug. 20, 1957  W. P. HICKEY  2,803,400
EFFICIENCY METERING SYSTEM
Filed Dec. 22, 1953  2 Sheets-Sheet 2

Inventor:
William P. Hickey,
by [signature]
His Agent.

United States Patent Office 2,803,400
Patented Aug. 20, 1957

2,803,400

EFFICIENCY METERING SYSTEM

William P. Hickey, Mishawaka, Ind.

Application December 22, 1953, Serial No. 399,685

11 Claims. (Cl. 235—61)

This invention relates generally to measuring and indicating systems for comparing the relative rates of change of a pair of variable quantities, and more particularly to a system for indicating the quotient of two variable rates. The invention is specifically adaptable to the automatic computation of the rate of fuel consumption of a vehicle in terms of distance per unit quantity of fuel, such as miles per gallon.

The present application is a continuation-in-part of my similarly entitled co-pending application Serial No. 170,376, filed June 26, 1950, now Patent No. 2,626,855.

The various methods and systems, which have been proposed in the past for computing the efficiency of an engine, may be considered as falling broadly within two general types.

The first type involves the measurement of a small quantity of fuel and the more or less direct measurement of the distance travelled during the consumption of this measured quantity. Such systems may be relatively simple and inexpensive, but they suffer from the obvious defect that readings are intermittent, and separated by comparatively long intervals during which no indication of the instantaneous efficiency is available. For this reason, they have not found general acceptance with the public and are used only as laboratory devices.

The second type involves the continuous measurement of the distance travelled per unit of time and of the quantity of fuel consumed per unit of time, thereby providing two variable rates, and the division of one rate by the other to provide the distance travelled per unit of fuel, as a quotient. Where these operations are to be performed mechanically, it will be understood that the variable rates must be converted to logarithmic forces or displacements, that is, to forces or displacements proportional to the logarithm of the rates. Thereupon, the logarithm of the quotient may be obtained by the process of subtracting or opposing the forces or displacements, the actual quotient being indicated on a scale suitably calibrated with the antilogarithm.

My invention is specifically concerned with a system of the second type, and, by means of a novel construction which will be described herein, it provides such a simplification and economy of construction as to make an efficiency meter a practical device for use in ordinary automobiles. It will, of course, be understood that the principal reason why such devices have not heretofore found wide usage has been their excessive complexity and the resulting cost.

Accordingly, the principal object of my invention is to provide a simple and economical instrument for continuously measuring and indicating the ratio of two variable quantities.

Another object of the invention is to provide a performance meter for indicating the quotient of two variable rates.

The specific object of the invention is to provide a simple and inexpensive performance meter, which may be used in conjunction with automotive vehicles and positioned on the dashboard, to give an indication to the driver of the miles being obtained per gallon of fuel at any instant.

In its broad aspects, my invention is characterized by the provision of a pair of logarithmic cams, suitably fixed on shafts whose angular displacements are proportional to the rates which they respectively measure, such as vehicle velocity for the one, and rate of fuel flow for the other. By a logarithmic cam, it is intended to signify a cam wherein the radial distance of a point on the face is proportional to the logarithm of the angle made by a radius vector through the point with respect to a reference position. Associated with each cam, and bearing against its logarithmic face, is a floating member and a self-actuating follow-up member such as a self-energizing bi-metallic strip. The electrical circuit of each bi-metal element is completed through a similar element in an indicating meter, and these latter elements may be mechanically coupled in opposition to provide a single indication corresponding to the logarithmic quotient. The desired efficiency or performance figure may then be read directly on a suitably calibrated logarithmic scale.

One of the principal advantages of the invention results from the fact that the use of self-actuating elements reduces the frictional coupling to the cams and to the rate shafts practically to zero. It follows therefrom that the rate shaft corresponding to the vehicle velocity may be connected directly to the usual automotive speedometer, and the rate shaft corresponding to fuel flow may be coupled directly to an inexpensive flow-meter of known construction. These factors make the invention commercially practical through its extreme simplicity.

For further objects and advantages and a better understanding of the invention, attention is now directed to the following description and accompanying drawings. The features of the invention believed to be novel will be more particularly pointed out in the accompanying claims.

Figure 1:
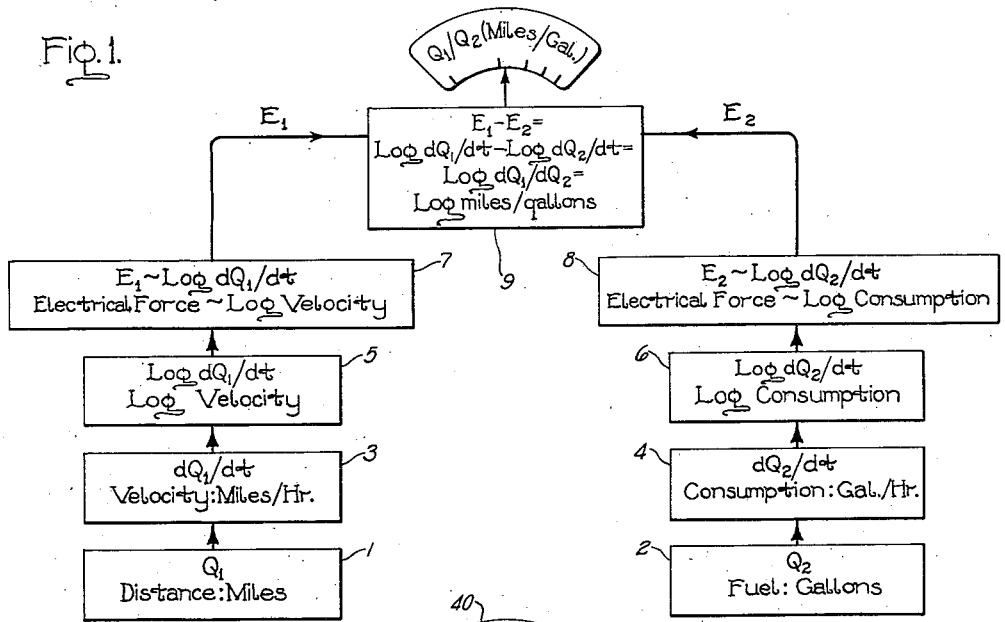
Fig. 1 is a block diagram illustrating, by a relatively simple mathematical analysis, the basic principles underlying my invention.

Referring to Fig. 1, blocks 1 and 2 represent a pair of quantities changing in magnitude with time. These quantities, denoted by $Q_1$ and $Q_2$ respectively, may assume any form provided they are measurable, and it is not intended to limit them to the displacement of a vehicle and the change in the amount of a fuel. In accordance with the invention, displacements, linearly proportional to the rates of change of these quantities, are derived, as represented by $dQ_1/dt$ and $dQ_2/dt$ respectively, in blocks 3 and 4. Further displacements, logarithmically proportional to the first displacements, are derived, as represented by log $dQ_1/dt$ and log $dQ_2/dt$ in blocks 5 and 6, respectively. Thereafter, these logarithmic displacements are utilized to produce proportional electrical forces, represented by $E_1$ and $E_2$ in blocks 7 and 8 respectively. These electrical forces are produced by a novel arrangement of extreme simplicity which does not cause any frictional loading on the members subject to the above-mentioned displacements. Finally, the electrical forces are utilized in opposition in block 9 to produce a suitable indication on a logarithmic scale. It will be understood that the opposition of forces logarithmically proportional to given quantities is equivalent to the division of these quantities one by the other, so that the resultant force is proportional to the logarithm of the quotient of the quantities. Thus, the resultant indication at block 9 is proportional to log $dQ_1/dQ_2$, and the scale may be calibrated to read $dQ_1/dQ_2$ directly, that is, the rate of change of the first quantity $Q_1$ with respect to the second quantity $Q_2$.

Figure 2:
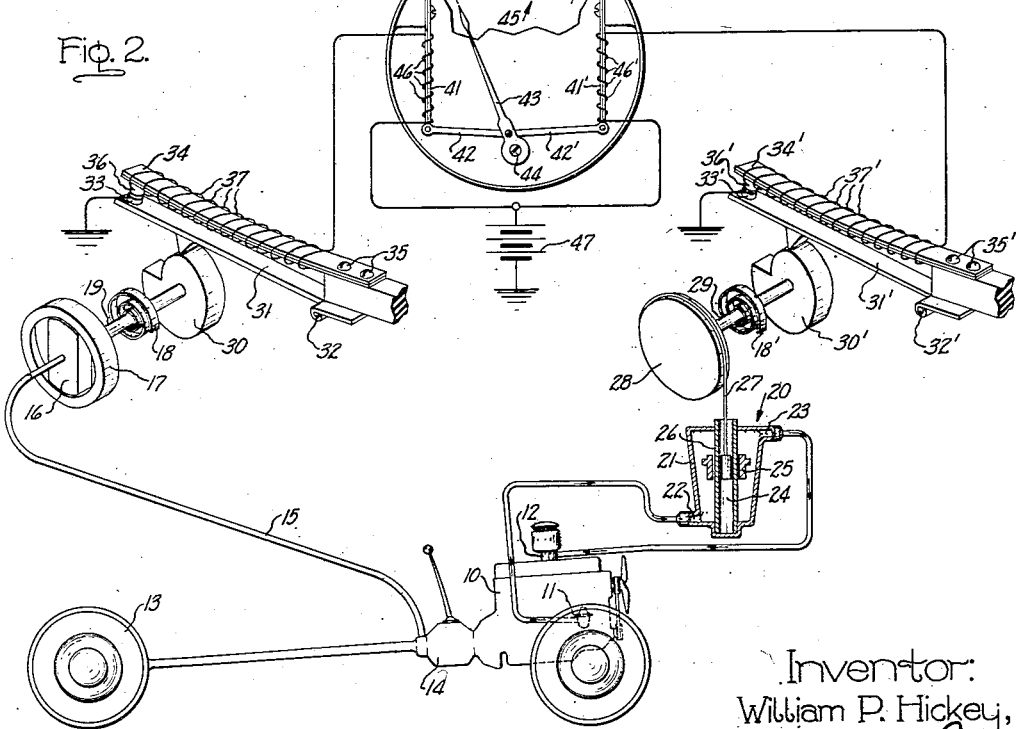
Fig. 2 is a schematic diagram, pictorial in form, showing an embodiment of my invention, as applied to an automotive vehicle for indicating performance in terms of miles per gallon of fuel.

Referring to Fig. 2, there is shown an embodiment of the invention as applied to an automobile to provide a performance measuring system indicating miles per gallon of fuel. The automobile comprises an engine 10, equipped with a liquid fuel pump 11 and a carburetor 12 provided with the usual float chamber. The pump supplies the fuel to the carburetor in the amount required at any time by the engine under its operating conditions. The engine transmits power to the rear driving wheels 13 by means of a transmission 14, wherein a flexible shaft 15 is linked, by a suitable gearing, to revolve at a rate proportional to that of the rear wheels. The number of revolutions made by the flexible shaft is thus proportional to the distance travelled by the automobile.

Flexible shaft 15 drives a mechanism similar to the usual automotive speedometer, and comprising a magnetised rotor 16, directly connected to the shaft, and an armature 17, which is in effect a conductive shell surrounding the rotor. When the rotor revolves, it generates eddy currents within the armature which tend to drag it in the same direction. The force exerted on the armature is proportional to the angular velocity of the rotor; however, the rotation of the armature is resisted by a spiral spring 18 coupled to the supporting shaft 19, so that the armature only turns through a limited range wherein its angular deviation from the rest position is proportional to the angular velocity of rotor 16. By reference to the mathematical representation of Fig. 1, the angular deviation of shaft 19 is proportional to $dQ_1/dt$.

It will be understood that, in practice, the usual automobile speedometer may be employed for the arrangement described above, in which case shaft 19 would be simply an extension of the speedometer pointer shaft.

The pump 11 supplies fuel to the float chamber of carburetor 12 in an amount governed by the current requirements of the engine. It will be understood that, in the usual fuel pump system, this is achieved by providing a lost motion linkage in the coupling between the engine and the pump. In accordance with the invention, the fuel, rather than being delivered directly to the carburetor from the pump, is made to flow through a rate measuring device 20, commonly known in the art as a rotometer, the direction of flow of fuel through the piping being indicated by the arrows. Rotometer 20 comprises a conically expanded casing 21, provided with an inlet opening 22 at its lower end and with an outlet opening 23 at its upper end. Located within the casing 21, in a manner to surround a central tubular bore 24, is a ring-shaped primary magnet 25. Located within the bore, is a cylindrical secondary magnet 26, connected by a flexible wire 27, to a pulley 28 supported on a shaft 29.

When fuel flows through the casing of the rotometer, it tends to lift primary magnet 25 upwards from its rest position at the bottom of the bore. The height to which the magnet is lifted depends upon the velocity of fuel flow through the casing, and it will be seen that the expanding shape provided to the casing has for effect the reduction of fuel velocity towards the upper end. Thus, through suitable shaping of the casing, the vertical displacement of the primary ring magnet may be made directly proportional to the rate of fuel flow from the pump to the carburetor. The magnetic field linking the secondary magnet to the primary ring magnet causes it to follow in synchronism. It will be understood, of course, that the central bore of the casing is made of a nonmagnetic material, in order to permit the magnetic field to maintain the two elements in alignment. As a result, the secondary magnet reproduces exactly the movement of the primary ring magnet within the casing, and, through its flexible linkage with the pulley 28, imparts to the shaft 29, an angular deviation from its rest position which is proportional at any instant to the rate of fuel consumption of the engine at any time. By reference to the mathematical representation of Fig. 1, the angular deviation of shaft 29 is proportional to $dQ_2/dt$.

Shafts 19 and 29 have affixed at their ends, similar logarithmically shaped cams 30 and 30' respectively. These cams are so proportioned that their radial surfaces describe a logarithmic spiral. In other words, the radial distance from any point on the cam surface to the axis of the shaft, is proportional to the logarithm of the angle made by a line through this point with a reference line or vector. A very light blade 31 bears again the surface of cam 30. The blade is hinged at one end, as shown at 32, and carries a grounded contact 33 at the other. Similar elements indicated by like reference numerals characterized by a prime mark, cooperate with cam 30'. Contacts 33 and 33' thus have vertical displacements which are proportional to the logarithms of vehicle speed and fuel consumption, respectively.

A bi-metallic element 34, fixed at 35, carries a contact 36 which cooperates with contact 33. An electrically insulated heating coil 37 is wound around element 34, and is connected in an electrical energizing circuit which is closed whenever contacts 33 and 36 touch. The flow of current through the heating coil, whenever the circuit is closed, heats up the bi-metallic element and causes it to deflect upwards an amount just sufficient to break contact. The thermal inertia and lag of the elements then causes the bi-metallic element to continue to deflect a very slight amount past the break-contact point; it then cools until contact is made again, whereupon the heating operation repeats. Contacts 33 and 36 thus continually make and break, and contact 36 follows the movement of contact 33. The arrangement is essentially a self-energizing member which automatically follows the displacement of a floating member, the self-energizing member being bi-metallic element 34, and the floating member being hinged blade 31. Similar elements, denoted by like numerals characterized by a prime mark, cooperate with cam 30'.

In order to obtain a performance indication, it is necessary to oppose the displacements occurring at the cam surfaces. In accordance with the invention, this is accomplished by a meter or indicating instrument 40, wherein a pair of bi-metallic elements, 41 and 41', are fixed at one end to a support plate, while their free ends are held in constant spatial relationship, one with respect to the other, by means of a pair of links 42 and 42', which are hinged together and to a pointer 43. This pointer is, in turn, hinged to the support plate at 44. Pointer 43 amplifies the motion of the links 42—42' and permits reading a performance figure upon a scale 45, logarithmically calibrated in miles per gallon. Bi-metallic elements 41 and 41' have heating coils 46 and 46' wound thereover and electrically insulated therefrom. The circuits of these heating coils are completed through the heating coils 37 and 37' respectively, previously mentioned, and a source of current such as a battery 47. Preferably, the bi-metallic elements 41 and 41' are in every respect similar, except that they are mounted in reverse order so that when they are heated they tend to deflect in opposite directions.

In the operation of the system as a whole, the bimetallic elements 34 and 34' automatically follow the cam surfaces. However, the same electrical currents as cause the deflections of these elements also flow through the heating coils of elements 41 and 41'. Were elements 41 and 41' completely free to move, each would reproduce the displacement of its associated element 34 and 34'. However, being linked together and disposed to oppose each others movement, they exert forces proportional to the movements which they would have if free. The resultant force is mathematically equivalent to an arithmetical subtraction, and thus, links 42–42' are subject to a small displacement which is proportional to the difference in the displacements of bi-metallic elements 34 and 34'. The movement of pointer 43 is accordingly proportional to this difference, and the logarithmic indication on the scale 45 gives the desired performance figure. By reference to the mathematical representation of Fig. 1, pointer 43 deflects proportionally to log $dQ_1/dQ_2$, and the scale indication reads $dQ_1/dQ_2$, that is, the rate of change of mileage with respect to fuel consumed, or miles per gallon.

Although the cams 30 and 30' have been described as logarithmic spirals, it will be understood that, in practice, they may be modified from this form in order to compensate for the error introduced by the finite length of the bi-metallic elements 34 and 34'. The free ends of the bi-metallic elements move in an arc, rather than in a straight line; moreover, the curvature of these elements when heated introduces a slight additional error. These errors may be reduced to any desired degree, either by making the bi-metal elements proportionally longer in order to reduce the arc of travel of the free ends, or by suitably modifying the shape of the cams from the theoretical logarithmic spiral.

The embodiment which is illustrated in Fig. 2 has been found to provide a practical construction. However, various alternatives may be employed: for instance, the hinged blades 31 and 31' may be dispensed with and the cams provided with a conductive metal and grounded, either at the shafts or by contact brushes. With such a modification, the contacts 36 and 36' on the bi-metallic elements ride directly on the cam surfaces, which surfaces operate as the cooperating contacts. Also, it has been found that the meter 40 may be modified in the linkages between the bi-metallic elements 41 and 41' and the pointer. Thus, a single solid link combining 42 and 42' may be used with a pin running in a slot in pointer 43.

Figure 3:
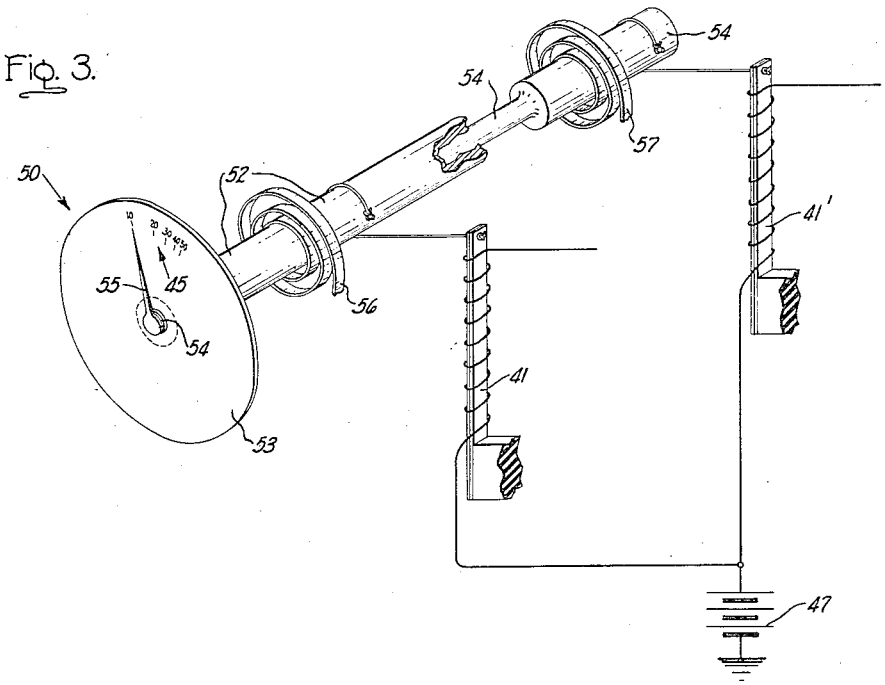
Fig. 3 is a simplified pictorial illustration of an indicating device which may be used in lieu of that shown in Fig. 2, in association with the system shown therein, and which provides essentially the same indication.

Referring to Fig. 3, there is shown another construction of a meter or indicating device, which may be used with the remainder of the system shown in Fig. 2 in lieu of meter 40. Meter 50, instead of achieving the desired logarithmic division by the opposition of the forces of the two bi-metallic elements 41 and 41' as in Fig. 2, utilizes the unrestrained deflections of these elements. Thus element 41 is linked to a shaft 52 supporting a face card 53 on which there is printed the usual logarithmic scale 45, whereas element 41' is linked to a shaft 54 carrying a pointer 55 and causes it to rotate in the same direction as the face card. The actual displacement of the pointer with respect to the face card is thus the difference between the two displacements considered with respect to the support plate, and pointer 55 indicates the quotient or performance figure directly on scale 45 in the same fashion as in the construction shown in Fig. 2. Light spiral springs 56 and 57 may be utilized to stabilize the positions of the face card and pointer respectively.

It will be realized, from the description of these embodiments of the invention, that a remarkable simplification has been effected over the devices known heretofore. The use of bi-metallic strips as self-actuating follow-up elements, whose movements are automatically repeated at the indicating instrument, eliminates the need for costly mechanical repeating devices or linkages. Moreover, these elements may be arranged to be temperature compensating since they are utilized in opposition. In other words, only the difference between their respective movements is utilized, rather than these movements themselves. In practice, the application of the system to an automobile entails a modification in the usual speedometer to incorporate a logarithmic cam and its associated bi-metallic element, the addition of the rotometer and associated cam and bi-metallic element in the fuel line between the pump and the carburetor, and the location of the indicating instrument on the dashboard.

Various modifications in the systems I have described in detail will suggest themselves to those skilled in the art, without, however, departing from the basic idea of the invention. For example, the initial condition responsive elements, the rotometer and speedometer in a vehicle efficiency metering system, could be of a nature to provide directly logarithmically proportional displacements and thereby obviate the need for logarithmic cams as set forth. Likewise, the indicating instrument employed may be of a different specific type, such as an armature type wherein opposed torques provide the desired indication; the control elements producing the described electrical forces are also subject to variation within my concept of providing such forces which are respectively parameters of logarithmic functions of the conditions to be measured.

Other modes of applying the principle of the invention may be employed, change being made as regards the details described, provided the features stated in any of the following claims, or the equivalent of such, be employed.

I therefore particularly point out and distinctly claim as my invention:

1. In a system for determining the quotient of two variable conditions, means for energizing two separate electrical circuits with pulsating current, means for causing the duration of the current impulses in one circuit to vary as a parameter of a logarithmic function of one such condition, means for causing the duration of the current impulses in the other circuit to vary as a parameter of a logarithmic function of the other condition, and means responsive to average current flow in the two circuits operative to provide an indication which is logarithmically proportional to the quotient of said conditions.

2. In a system for determining the quotient of two variable conditions, a pair of electrical circuits each including a thermostatic interrupter operative to cause current supplied thereto to flow in a series of impulses, means causing the cyclic operation of said interrupters to vary respectively as parameters of logarithmic functions of the two conditions, and means responsive to the average current flow in the two circuits providing an indication which is logarithmically proportional to the quotient of said conditions.

3. In a system for determining the quotient of two variable conditions, a pair of electrical circuits each including a thermostatic interrupter operative to cause current supplied thereto to flow in a series of impulses, means causing the cyclic operation of said interrupters to vary respectively as parameters of logarithmic functions of the two conditions, and thermostatically operated indicating means responsive to the average current flow in the two circuits providing an indication which is logarithmically proportional to the quotient of said conditions.

4. In a system for determining the quotient of two variable conditions, a pair of electric circuits, means supplying current to said circuits, a thermostatic interrupter in each circuit including two contact members, one of which is bi-metallic, and a heating winding in electrical series with the respectively associated contacts, thereby to cause the current to flow in impulses in the two circuits, means for displacing one contact member of one such interrupter in amounts logarithmically proportional to variations in one of the conditions, means for similarly displacing a contact member of the other interrupter in amounts logarithmically proportional to variations in the other condition, whereby the average current flow in the two circuits will be caused to vary respectively as parameters of logarithmic functions of the two conditions, and means responsive to the average current of the two circuits operative to provide an indication proportional to the logarithm of the quotient of the said conditions.

5. A system for indicating the instantaneous quotient of two variable quantities, comprising a pair of logarithmic cams, means providing displacements to said cams respectively proportional to said quantities, a pair of first members each having one end bearing against respective ones of said cams, electrical contacts on said members, a pair of bi-metallic strips each supporting a contact cooperating with one of said first-mentioned contacts and provided with heating windings in series connection therewith adapted to be energized by the flow of current from a source of electrical energy, said strips being arranged to deflect away from said first members in response to flow of electrical current through said heating windings resulting from the engagement of their cooperating contacts and to deflect towards said members upon disengagement of said contacts, each cooperable pair of such contact members being included in a separate electrical circuit to cause the respective currents therein to flow in impulses, said cams being operative to cause the duration of the current impulses in the two circuits to vary respectively as parameters of logarithmic functions of the two conditions, and means responsive to average current flow in the two circuits operative to provide an indication which is logarithmically proportional to the quotient of the variable quantities.

6. A system for indicating the instantaneous quotient of two variable quantities, comprising a pair of logarithmic cams, means providing displacements to said cams respectively proportional to said quantities, a pair of first members each having one end bearing against respective ones of said cams, electrical contacts on said members, a pair of bi-metallic strips each supporting a contact cooperating with one of said first-mentioned contacts and provided with heating windings in series connection therewith adapted to be energized by the flow of current from a source of electrical energy, said strips being arranged to deflect away from said first members in response to flow of electrical current through said heating windings resulting from the engagement of their cooperating contacts and to deflect towards said members upon disengagement of said contacts, a similar pair of bi-metallic strips supported at one end to substantially repeat the deflections of the first pair of bi-metallic strips by having heating windings respectively connected in series with said first-mentioned heating windings, and means mechanically linked to the movable ends of said last-mentioned pair of strips for providing directly readable indications proportional to the quotient of the variable quantities by the actuation thereof.

7. An efficiency metering system for indicating miles per gallon of fuel consumed in a vehicle, comprising a pair of logarithmically shaped rotatable cams, means for providing angular displacements to said cams respectively proportional to the velocity of said vehicle and to the flow rate of fuel consumed, a pair of first members each having one end hinged and the other end free and bearing against respective ones of said cams, electrical contacts carried by said members at said free ends, said contacts thereby deflecting in amounts proportional to the logarithm of respective ones of said rates, a pair of bi-metallic strips each carrying a contact cooperating with respective ones of said first contacts and provided with heating windings in series connection therewith adapted to be energized by the flow of current from an electric source, said bi-metallic strips being arranged to deflect away from said first members by the flow of current through said heating windings caused upon engagement of said contacts and to deflect towards said members upon disengagement of said contacts, and a similar pair of bi-metallic strips having heating windings respectively connected in series with said first-mentioned heating windings to repeat substantially the deflection of the first pair of bi-metallic strips, said last-mentioned pair of bi-metallic strips having their movable ends mechanically coupled to provide resultant deflections proportional to the logarithm of the quotient of said rates and thereby providing a measure of said efficiency.

8. A system for measuring the instantaneous quotient of two variable rates, comprising a pair of cams having substantially logarithmically shaped peripheral surfaces, means for rotating said cams in amounts proportional to respective ones of said rates, a pair of first members having one end hinged and the other end free and bearing against said peripheral surfaces, electrical contacts carried by said members at said free ends, a pair of bi-metallic strips carrying contacts cooperating with respective ones of said first contacts and provided with heating windings in series connection with said contacts, said bi-metallic strips being arranged to deflect away from said first members by the flow of current from an electrical source through said heating windings caused upon engagement of said contacts and to deflect towards said members upon disengagement of said contacts, and a similar pair of bi-metallic strips supported at one end and arranged to substantially repeat the deflections of the first pair of bi-metallic strips by having heating windings connected in series circuit with respective ones of said first-mentioned heating windings, a hinged pointer, said last-mentioned pair of bi-metallic strips having their free ends mechanically linked to said pointer and arranged to operate in opposition thereon, said pointer thereby deflecting an amount proportional to the logarithm of the quotient of said rates and providing a measure of said efficiency.

9. A system for measuring the instantaneous quotient of two variable rates, comprising a pair of cams having substantially logarithmically shaped peripheral surfaces, means for rotating said cams in amounts proportional to respective ones of said rates, a pair of first following members having one end hinged and the other end free and bearing against said peripheral surfaces, electrical contacts carried by said members at said free ends, a pair of bi-metallic strips mounted in substantial parallelism with said following members and carrying contacts cooperating with respective ones of said first contacts, heating windings on said strips connected in series with said contacts, a common source of electrical energy connected for energizing the series circuits of the heating windings, said bi-metallic strips being arranged to deflect away from said following members on the flow of current from said source through said heating windings caused upon engagement of said contacts and to deflect towards said members upon disengagement of said contacts, and a similar pair of bi-metallic strips held substantially stationary for one of their ends to substantially repeat the deflections of the first pair of bi-metallic strips by having heating windings connected in series with respective ones of said first-mentioned heating windings forming corresponding series circuits therewith, a hinged pointer, links connecting the movable ends of said last-mentioned pair of strips to said pointer for operating thereon in opposition to each other, said pointer thereby directly indicating an amount proportional to the logarithm of the quotient of said rates and providing a measure of said efficiency.

10. An efficiency metering system for indicating miles per gallon of fuel consumed in a vehicle, comprising a pair of cams having substantially logarithmically shaped peripheral surfaces, means for rotating said cams in amounts respectively proportional to respective ones of said rates in the form of vehicle velocity and fuel consumed, a pair of first following members having one end hinged and the other free end bearing against said peripheral surfaces, electrical contacts carried by said members at said free ends, a pair of bi-metallic strips mounted in substantial parallelism with said following members and carrying contacts cooperating wtih respective ones of said first contacts, heating windings on said strips connected in series with said contacts, a source of electrical energy for energizing from a common connection the circuits including each set of heating windings connected in series, said bi-metallic strips being arranged to deflect away from said following members caused by the flow of current from said source through said heating windings resulting from the engagement of said contacts and to deflect towards said members upon disengagement of said contacts, and a similar pair of bi-metallic strips arranged to substantially repeat the deflections of the first pair of bi-metallic strips by having heating windings connected in series with respective ones of said first-mentioned heating windings forming corresponding series circuits therewith, a logarithmically calibrated face card and a pointer associated therewith, and means for causing said last-mentioned bi-metallic strips to rotate said face card and said pointer in the same direction as said rates increase, thereby to provide a directly readable indication of said efficiency.

11. In a system for determining a predetermined function of two variable conditions, means for energizing two separate electrical circuits with pulsating current, means for causing the duration of the current impulses in one circuit to vary as a parameter of a logarithmic function of one such condition, means for causing the duration of the current impulses in the other circuit to vary as a parameter of a logarithmic function of the other condition, and means responsive to average current flow in the two circuits operative to provide an indication which is logarithmically proportional to the desired predetermined function of said conditions.

References Cited in the file of this patent

UNITED STATES PATENTS

| | | |
|---|---|---|
| 2,500,585 | Sylvander | Mar. 14, 1950 |
| 2,627,372 | Razek | Feb. 3, 1953 |

FOREIGN PATENTS

| | | |
|---|---|---|
| 357,525 | Great Britain | Sept. 21, 1931 |
| 608,114 | Great Britain | Sept. 9, 1948 |
| 263,395 | Italy | Mar. 15, 1929 |